(12) United States Patent
Osaka

(10) Patent No.: US 8,643,964 B2
(45) Date of Patent: Feb. 4, 2014

(54) LENS DRIVING DEVICE WITHOUT PERMANENT MAGNET

(75) Inventor: Tomohiko Osaka, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 13/613,558

(22) Filed: Sep. 13, 2012

(65) Prior Publication Data

US 2013/0077184 A1    Mar. 28, 2013

(30) Foreign Application Priority Data

Sep. 28, 2011 (JP) ................ 2011-213061

(51) Int. Cl.
*G02B 7/02* (2006.01)

(52) U.S. Cl.
USPC ........ 359/824; 359/814; 359/696; 310/12.16; 369/44.14

(58) Field of Classification Search
USPC .......... 359/811, 814, 819, 820, 823, 824, 359/694–696; 310/12.16, 12.32, 14; 348/208.11; 396/55, 85, 133; 369/44.14–44.16

See application file for complete search history.

(56) References Cited

U.S. PATENT DOCUMENTS

| 7,400,068 B2 * | 7/2008 | Tseng ................ 310/12.16 |
| 8,000,022 B2 * | 8/2011 | Niederer ............. 359/665 |
| 8,077,398 B2 * | 12/2011 | Osaka et al. .......... 359/696 |
| 8,189,280 B2 * | 5/2012 | Ollila et al. .......... 359/824 |

FOREIGN PATENT DOCUMENTS

JP    2007-271878 A    10/2007

* cited by examiner

*Primary Examiner* — Loha Ben
(74) *Attorney, Agent, or Firm* — Holtz, Holtz, Goodman & Chick, PC

(57) ABSTRACT

A lens driving device, which movably supports a lens assembly along a direction of an optical axis of a lens, includes an actuator base disposed to a lower side of the direction of the optical axis, a lens holder made of a ferromagnet that is disposed to an upper side of the actuator base and which has a tubular portion for holding the lens assembly, a ring-shaped driving coil fixed to the lens holder so as to be positioned around the tubular portion, a yoke covering the lens holder so as to be apart from the driving coil and to oppose to the lens holder in a state where the driving coil is sandwiched therebetween, and a guide arrangement guiding the lens holder along the direction of the optical axis.

12 Claims, 8 Drawing Sheets

US 8,643,964 B2

LENS DRIVING DEVICE WITHOUT PERMANENT MAGNET

This application is based upon and claims the benefit of priority from Japanese Patent Application No. 2011-213061, filed on Sep. 28, 2011, the disclosure of which is incorporated herein in its entirety by reference.

BACKGROUND OF THE INVENTION

This invention relates to a lens driving device and, in particular, to a lens driving device capable of moving a lens holder (a moving portion) holding a lens assembly (a lens barrel) in an optical direction of a lens.

A portable compact camera is mounted in a camera-equipped cellular mobile phone. The portable compact camera is provided with an autofocus lens driving device. Previously, various autofocus lens driving devices have been proposed. As a driving source (a driving method) used in such a lens driving device, a VCM scheme using a voice coil motor (VCM) is known.

A conventional lens driving device of the VCM scheme comprises, as the driving source (a driving portion), a driving coil and a magnetic circuit which comprises a yoke and a permanent magnet. The lens driving device is also called an actuator (e.g. see, Japanese Unexamined Patent Application Publication No. 2007-271878 (JP-A-2007-271878) (which will be also called Patent Document 1)).

More specifically, the conventional lens driving device of the VCM scheme drives the lens assembly (the lens barrel) using the VCM with a steplessly variable fashion between an infinity position and a macro position. Normally, the driving coil is fixed to a lens holder holding the lens assembly (the lens barrel). In a case of such a structure, the lens driving device of the VCM scheme becomes a moving-coil scheme. The lens driving device of the moving-coil scheme has a configuration in which the lens holder is driven by force based on Fleming's left-hand rule (Lorentz force) and the lens holder moves in the optical direction of the lens according to relationship (interaction) between a first magnetic field due to the magnet and a second magnetic field generated by flowing an electric current through the driving coil located in the first magnetic field.

As disclosed in Patent Document 1, the magnetic circuit in the conventional lens driving device of the VCM scheme includes the permanent magnet as an essential component.

As known in the art, inasmuch as the permanent magnet contains a rare metal as a composition, the magnetic circuit is expensive. In addition, inasmuch as the conventional lens driving device of the VCM scheme requires the permanent magnet, it is difficult to become smaller in size.

On the other hand, a thrust force becomes smaller in the conventional lens driving device of the VCM scheme with miniaturization of the lens driving device of recent years.

SUMMARY OF THE INVENTION

It is therefore an exemplary object of the present invention to provide a lens driving device which is inexpensive and miniature without having to use a permanent magnet.

Other objects of this invention will become clear as the description proceeds.

On describing the gist of an exemplary aspect of this invention, it is possible to be understood that a lens driving device is for movably supporting a lens assembly along a direction of an optical axis of a lens. The lens driving device comprises an actuator base disposed to a lower side of the optical axis and a lens holder disposed to an upper side of the actuator base. The lens holder has a tubular portion for holding said lens assembly. According to the exemplary aspect of this invention, the lens holder is made of a ferromagnet. A ring-shaped driving coil is fixed to the lens holder so as to be positioned around the tubular portion. A yoke covers the lens holder so as to be apart from the driving coil and to oppose to the lens holder in a state where the driving coil is sandwiched therebetween. A guide arrangement guides the lens holder along the direction of the optical axis.

DESCRIPTION OF THE EXEMPLARY EMBODIMENTS

Referring now to Figures, the description will proceed to exemplary embodiments of the present invention.

[First Exemplary Embodiment]

Figure 1:
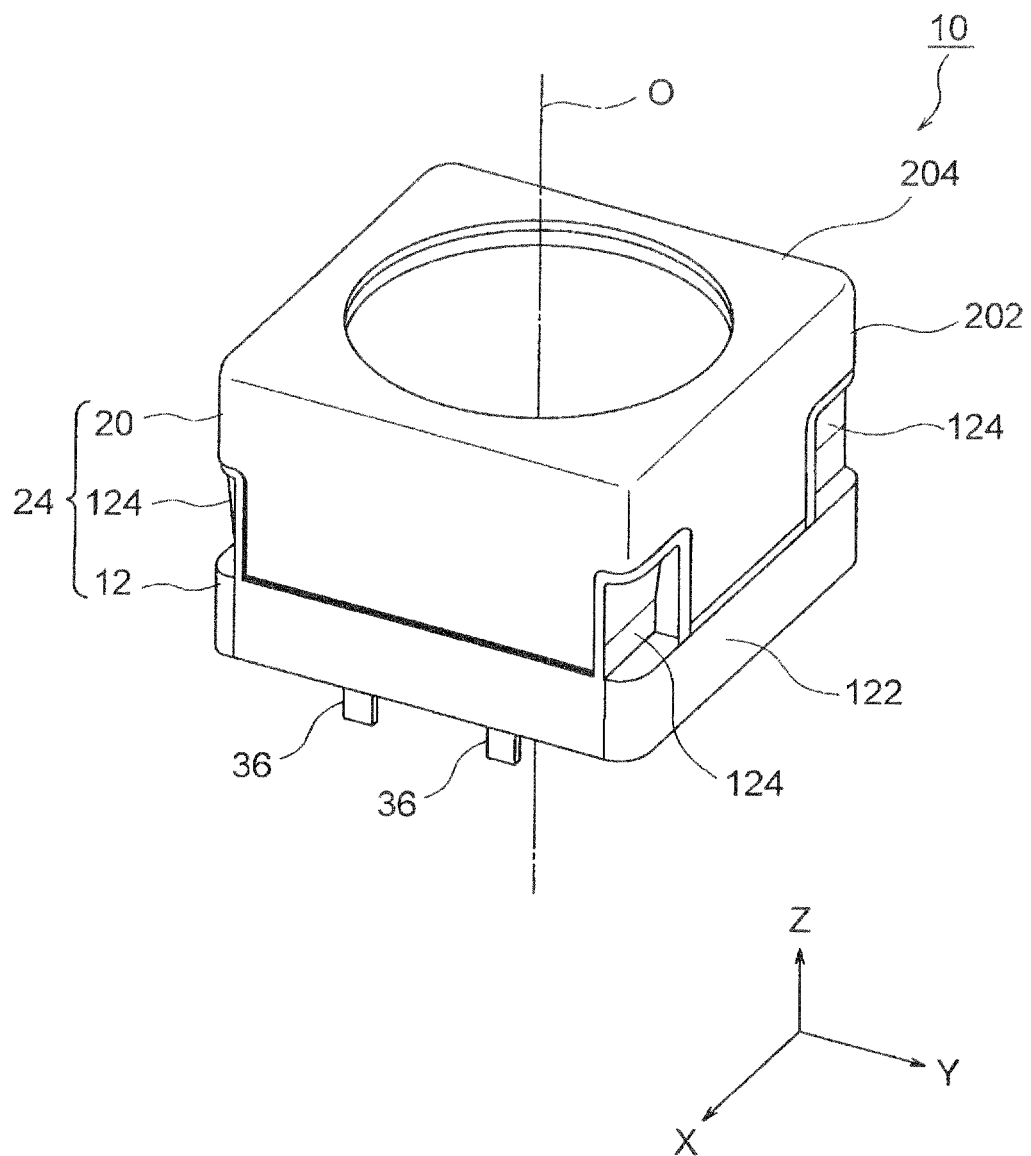
FIG. 1 is an external perspective view of a lens driving device according to a first exemplary embodiment of the present invention, seen from a slanting front-high side.
Figure 2:
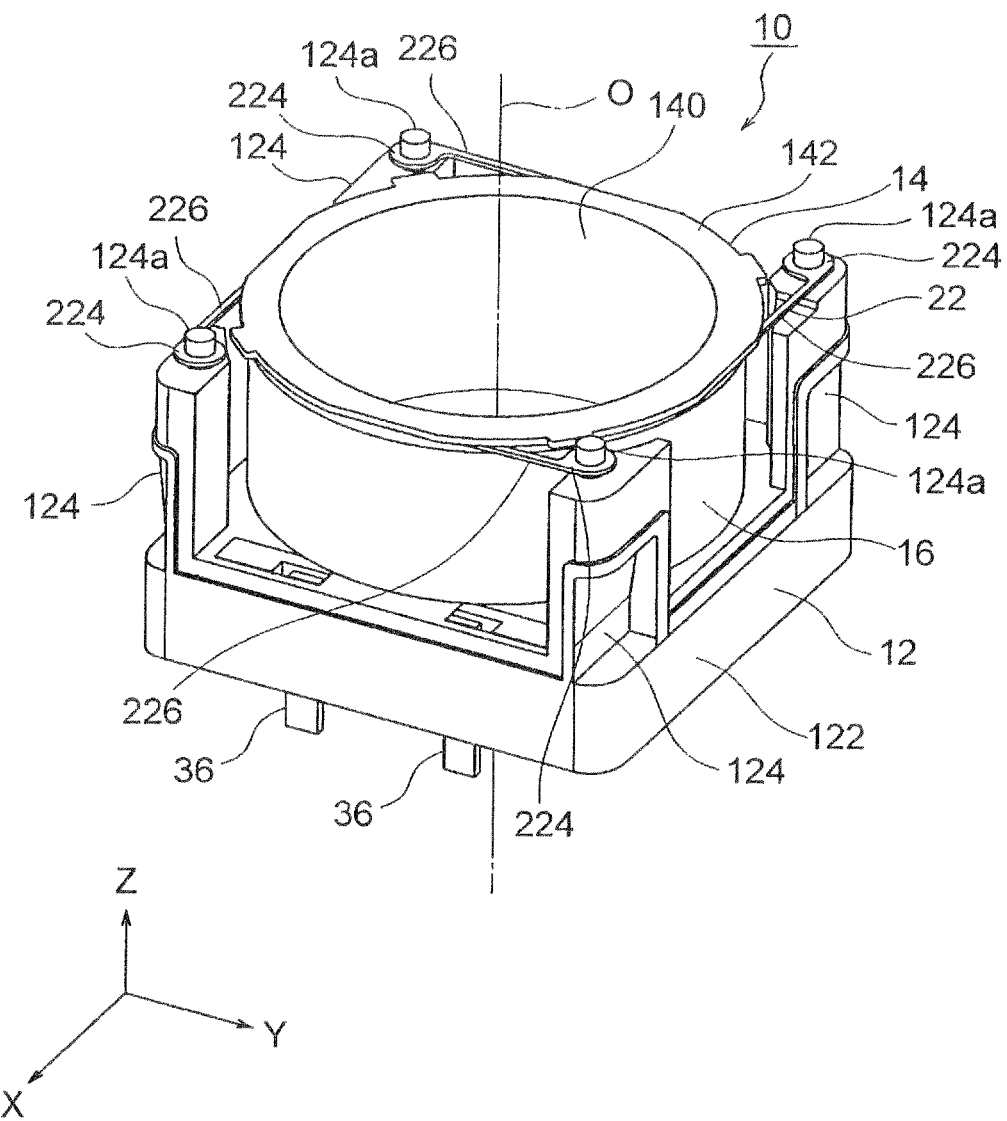
FIG. 2 is a perspective view of the lens driving device illustrated in FIG. 1 with a yoke omitted, seen from the slanting front-high side.
Figure 3:
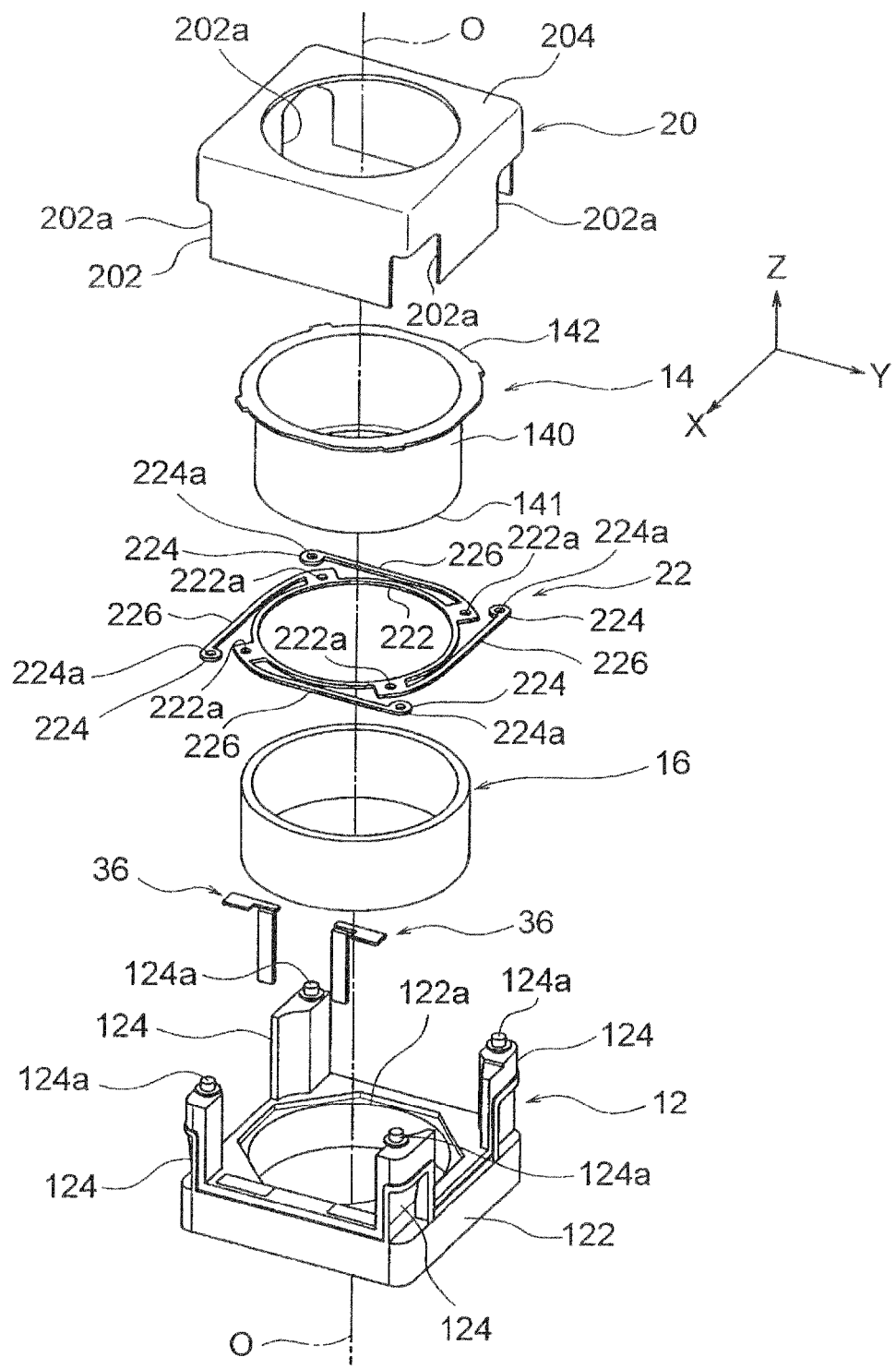
FIG. 3 is an exploded perspective view of the lens driving device illustrated in FIG. 1, seen from the slanting front-high side.

Referring to FIGS. 1 through 3, the description will proceed to a lens driving device 10 according to a first exemplary embodiment of this invention. FIG. 1 is an external perspective view of the lens driving device 10, seen from a slanting front-high side. FIG. 2 is a perspective view of the lens driving device 10 with a yoke 20 omitted, seen from the slanting front-high side. FIG. 3 is an exploded perspective view of the lens driving device 10, seen from the slanting front-high side.

Herein, in the manner shown in FIGS. 1 through 3, an orthogonal coordinate system (X, Y, Z) is used. In a state illustrated in FIGS. 1 through 3, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 through 3, the up-and-down direction Z is a direction of an optical axis O of a lens.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated lens driving device 10 has a substantially plane symmetric structure (except for a leaf spring 22 which will later be described) about a plane which passes the optical axis O and which is defined by (extending in) the fore-and-aft direction A and the up-and-down direction Z.

The illustrated lens driving device 10 is, for example, mounted to a camera-equipped cellular mobile phone which is able to perform automatic focusing. The lens driving device 10 includes a lens assembly (a lens barrel) 11 (see, FIGS. 4 and 5) embedding an autofocus lens serving as a moving lens. The lens driving device 10 is for moving the lens assembly 11 in the direction of the optical direction O alone. Accordingly, the optical axis O is a driving axis. The lens driving device 10 is also called an actuator.

The lens driving device 10 comprises an actuator base 12 which is disposed in a lower side (a rear side) in the Z-axis direction (the direction of the optical axis O). Although illustration is not made, the actuator base 12 has a lower portion (a rear portion) on which an image pickup device disposed on a sensor board is mounted. The image pickup device picks up a subject image formed by the lens assembly to convert it into an electric signal. The image pickup device may, for example, comprise a CCD (charge coupled device) type image sensor, a CMOS (complementary metal oxide semiconductor) type image sensor, or the like. Accordingly, a camera module comprises a combination of the lens driving device 10, the sensor board, and the image pickup device.

The lens driving device 10 comprises a lens holder 14 including a tubular portion 140 for holding the lens assembly (the lens barrel) 11, a ring-shaped driving coil 16 fixed to the lens holder 14 so as to position around the tubular portion 140 thereof, a yoke 20 disposed so as to be apart from the driving coil 16 and to oppose to the driving coil 16, and a leaf spring 22 disposed to an upper end of the tubular portion 140 of the lens holder 14 in the direction of the optical axis O in the manner which will later be described.

In the illustrated lens driving device 10, the lens holder 14 is made of a ferromagnet such as an iron-based material, or the like.

Accordingly, in the lens driving device 10 according to the first exemplary embodiment, a magnetic circuit is composed of the lens holder 14 made of the ferromagnet and the yoke 20. A combination of the magnetic circuit (14, 20) and the driving coil 16 constitutes a driving portion of a moving-coil scheme.

In the conventional lens driving device, a magnetic circuit is composed of a permanent magnet and a yoke. In contrast with this, in the lens driving device 10 according to the first exemplary embodiment, the magnetic circuit is composed of the lens holder 14 made of the ferromagnet and the yoke 20. That is, the lens holder 14 serves as an electromagnet by flowing a current through the driving coil 16 wound around the lens holder 14. Inasmuch as the lens driving device 10 according to the first exemplary embodiment does not comprise a permanent magnet as the magnetic circuit, it is advantageous in that it is inexpensive and miniature.

The actuator base 12 comprises a ring-shaped base portion 122 and four base protrusion portions 124 protruding from four corners of the base portion 122 in the up-and-down direction Z upwards. The four base protrusion portions 124 have base projections 124a for projecting at upper ends thereof upwards, respectively. In addition, the base portion 122 has, at a front portion thereof, a pair of insertion holes (not shown) for inserting and setting a pair of electrodes 36. The base portion 122 has a circular opening portion 122a at a central portion thereof.

In addition, the pair of electrodes 36 is for supplying the driving coil 16 with power. Each of the electrodes 36 has a L-shape as shown in FIG. 3.

The actuator base 12 and the yoke 20 constitute a housing 24. The leaf spring 22 serves as an elastic member disposed between the lens holder 14 and the housing 24. That is, the leaf spring (the elastic member) 22 supports the lens holder 14 in the direction of the optical axis O shiftably alone so as to position the lens holder 14 in a radial direction.

The lens holder 14 has a lower end portion 141 which is inserted with play in the circular opening portion 122a of the base portion 122 of the actuator base 12. That is, the tubular portion 140 of the lens holder 14 has an outer diameter which is slightly smaller than a diameter of the circular opening portion 122a of the base portion 122. As a result, the lower end portion 141 of the lens holder 14 is opposed to the circular opening portion 122a of the base portion 122 of the actuator base 12 with a clearance. Accordingly, a combination of the leaf spring (the elastic member) 22 and the circular opening portion 122a of the base portion 122 of the actuator base 12 serves as a guide arrangement for guiding the lens holder 14 along the direction of the optical axis O.

In addition, the leaf spring 22 is also called an upper leaf spring. In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper leaf spring 22 is also called a front-side spring.

The upper leaf spring (the front-side spring) 22 is made, for example, of metal such as a stainless steel or a beryllium copper. In addition, the upper leaf spring (the front-side spring) 22 is manufactured by a press working against a predetermined thin plate or an etching working using photolithography technique. The etching working is desirable than the press working. This is because residual stress does not remain in the leaf spring in the etching working.

As shown in FIGS. 1 and 3, the yoke 20 has a rectangular cylindrical shape. Specifically, the yoke 20 comprises an outer hollow cylindrical portion 202 having a substantially rectangular cylindrical shape and a rectangular ring-shaped end portion 202 extending from an upper end of the outer hollow cylindrical portion 202 inwards of the outer hollow cylindrical portion.

The outer hollow cylindrical portion 202 of the yoke 20 has four opening portions 202a at lower end portions of four corners thereof.

The lens holder 14 has a flange 142 protruding in a radial direction outwards at an upper end thereof. The flange 142 and the ring-shaped end portion 204 are opposite to each other. The tubular portion 140 of the lens holder 14 has a cylindrical shape.

On the other hand, the driving coil 16 also has a cylindrical shape. The driving coil 16 is bonded at an outer wall surface of the tubular portion 140 of the lens holder 14.

In the manner which is described above, the leaf spring 22 is disposed at an upper end side of the lens holder 14 in the direction of the optical axis O.

The leaf spring 22 comprises a ring portion 222 mounted to the flange 142 of the lens holder 14 in the manner which will later be described and four end portions 224 mounted on four corners of the housing 24 in the manner which will later be described. Between the ring portion 222 and the four end portions 224, four arm portions 226 are bridged. Each arm portion 226 connects the ring portion 222 to the corresponding end portion 224.

The ring portion 222 of the leaf spring 22 is fixed to the flange 142 of the lens holder 14. Specifically, the flange 142 has four holder protrusion portions (not shown) protruding downwards in the vicinity of the four corners of the housing 24. The ring portion 222 of the leaf spring 22 has four spring holes 222a in which the four holder protrusion portions are inserted, respectively.

On the other hand, the four end portions 224 of the leaf spring 22 are fixed to the four base protrusion portions 124, respectively. Specifically, the four end portions 224 of the leaf spring 22 have four end portion holes 224a in which the four base projections 124a of the four base protrusion portions 124 are fitted.

Figure 4:
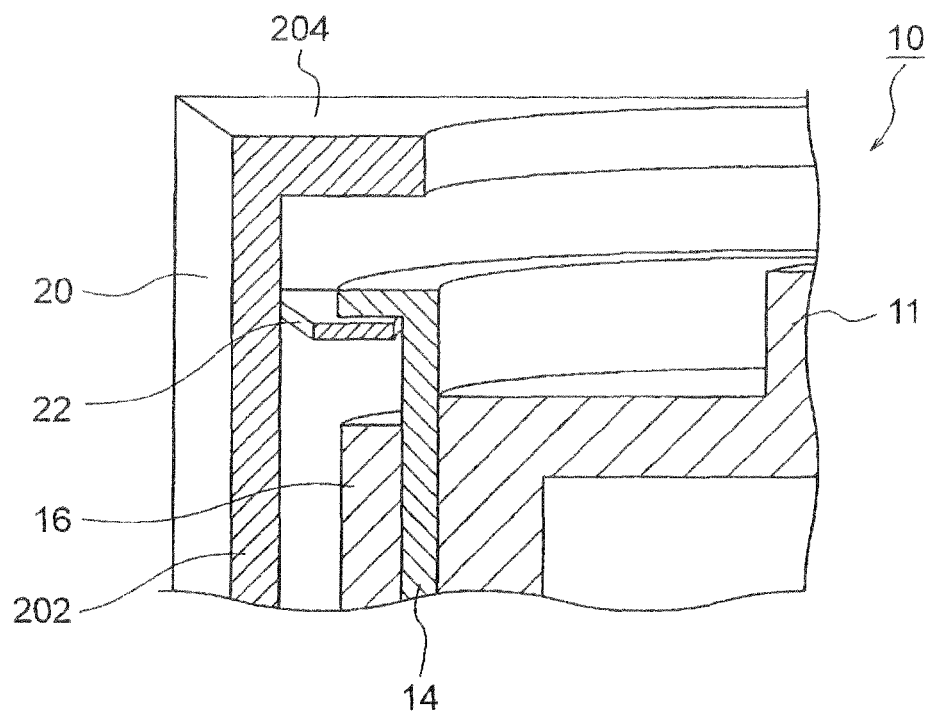
FIG. 4 is a partial perspective sectional view showing a state where a driving coil is not energized in the lens driving device illustrated in FIG. 1.
Figure 5:
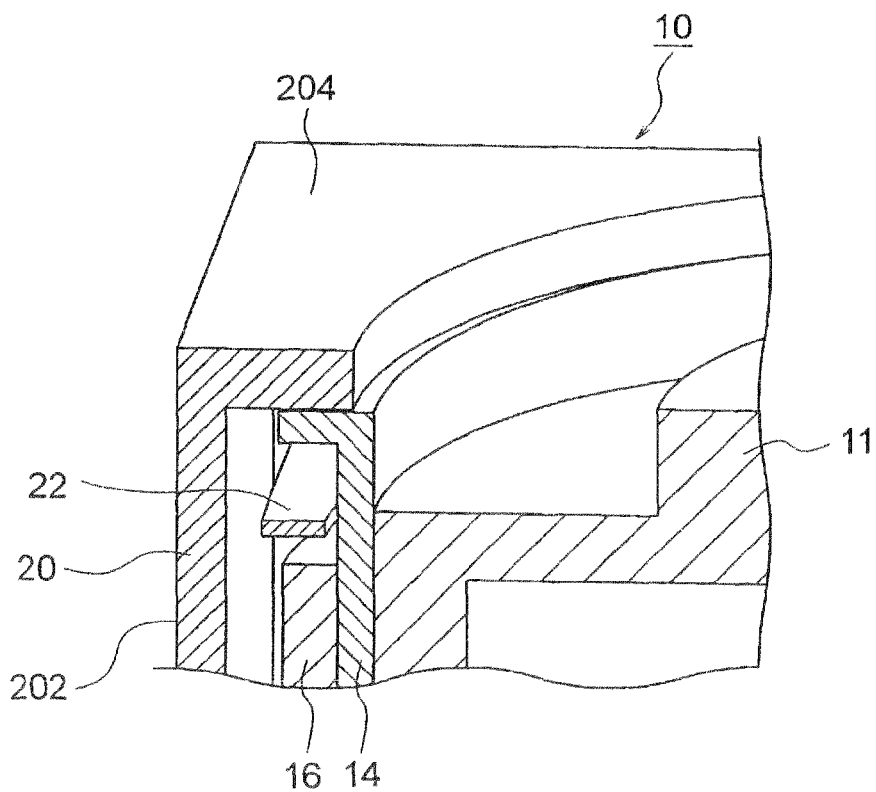
FIG. 5 is a partial perspective sectional view showing a state where the driving coil is energized by a maximum current through a pair of electrodes in the lens driving device illustrated in FIG. 1.

As shown in FIGS. 4 and 5, the lens assembly (the lens barrel) 11 is accommodated in an inner wall of the tubular portion 140 of the lens holder 14 and they are connected to each other via an adhesive agent or the like.

In the above-mentioned lens driving device (the actuator) 10, a combination of the lens holder 14 holding the lens assembly 11 and the driving coil 16 serves as a pillar-shaped movable portion (11, 14, 16) disposed in a central portion. In addition, a combination of the yoke 20 and the actuator base 12 serves as a tube-shaped fixed portion (20, 12) disposed around the movable portion (11, 14, 16).

Referring now to FIGS. 4 to 7 in addition to FIGS. 1 to 3, the description will proceed to operations of the lens driving device 10. The illustrated lens driving device 10 is operable at two different modes. A first operational mode is an operation mode for supporting a switching between two positions alone. A second operational mode is an operational mode for carrying out an auto-focusing (AF) operation also.

First, referring to FIGS. 1 to 6, description will be made as regards the first operational mode, thereafter, referring to FIGS. 1 to 5 and 7, description will be made as regards the second operational mode.

FIG. 4 is a partial perspective sectional view showing a state where the driving coil 16 is not energized in the lens driving device 10 while FIG. 5 is a partial perspective sectional view showing a state where the driving coil 16 is energized by a maximum current through the pair of electrodes 36 in the lens driving device 10.

As shown in FIG. 4, when the driving coil 16 is not energized, the lens holder 14 is put into a state where the flange 142 lies at a position apart from the ring-shaped end portion 204 of the yoke 20 and is supported by the leaf spring 22. This apart position is called an "infinity (INF) position" of the lens driving device 10.

On the other hand, as shown in FIG. 5, when the driving coil 16 is energized by a current more than a predetermined current value (which will later be called a "regulated current value") through the pair of electrodes 36, the lens holder 14 acts as the electromagnet, by an electromagnetic force overcoming an urging force of the leaf spring 22 downwards, it is put into a state where the flange 142 of the lens holder 14 and the ring-shaped end portion 204 of the yoke 20 are magnetically attracted to each other to come into contact with each other. This position of the state of coming into contact with each other is called a "macro position" of the lens driving device 10. In addition, in this moment, it is noted that the force based on the Fleming's lent-hand rule (the Lorentz force) also serves according to interaction between a magnetic field of the above-mentioned electromagnet and a magnetic field due to a current flowing through the driving coil 16. Accordingly, it is possible to make the flange 142 of the lens holder 14 come into contact with the ring-shaped end portion 204 of the yoke 20 because the above-mentioned electromagnetic force and the Lorentz force overcome the urging force of the leaf spring 22 downwards.

Figure 6:
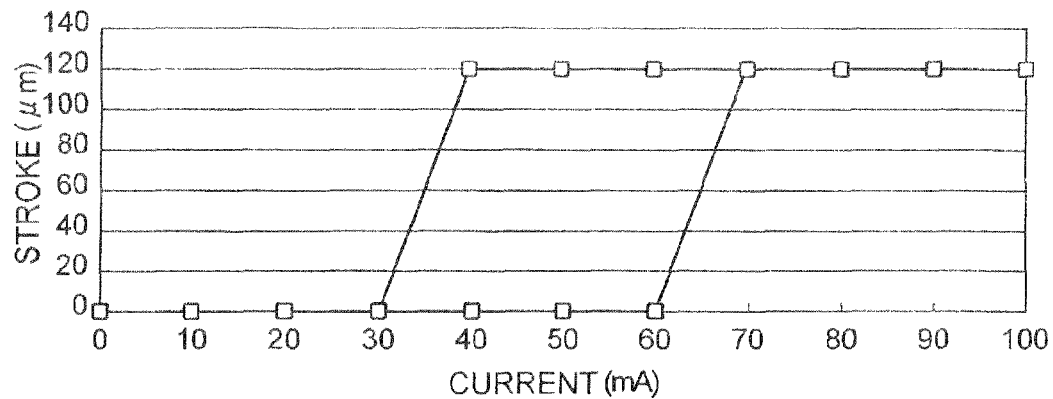
FIG. 6 is a view showing a current-stroke characteristic in a first operational mode of the lens driving device illustrated in FIG. 1.

FIG. 6 is a view showing a current-stroke characteristic in the first operational mode of the lens driving device 10. In FIG. 6, the horizontal axis represents a current (mA) flowing through the driving coil 16 and the vertical axis represents a moving distance (a stroke) (μm) of the lens holder 14. Herein, 0 μm indicates the position (the infinity (INF) position) of the state where the current does not flow through the driving coil 16 and the lens holder 14 is supported by the leaf spring 22. In the example being illustrated in FIG. 6, it is understood that the regulated current value is equal to 70 mA.

As apparent from FIG. 6, by flowing in the driving coil 16 the current more than the regulated current value, for example, the current of 80 mA, it is understood that it is possible to make the lens driving device 10 the infinity (INF) position by moving the lens holder by 120 μm.

In the manner which is described above, it is understood that it is possible to move the lens holder 14 (the lens assembly 12) along the direction of the optical axis O between the two positions (the infinity (INF) position and the macro position) by whether or not the driving coil 16 is energized via the pair of electrodes 36.

In addition, FIG. 6 is the view for use in describing the operation in the first operational mode which switches a position of the lens holder 14 between the two positions: the infinity (INF) position and the macro position. Accordingly, in the first operational mode, the behavior of an intermediate operation (0 μm to 120 μm) presents not problem.

Now, description will be made as regards the second operational mode.

In the second operational mode, the yoke 20 of the lens driving device 20 is preliminarily magnetized. In the example being illustrated, the yoke 20 is magnetized so that the ring-shaped end portion 204 of the yoke 20 becomes the north pole while the lower end portion of the yoke 20 becomes the south pole.

Figure 7:
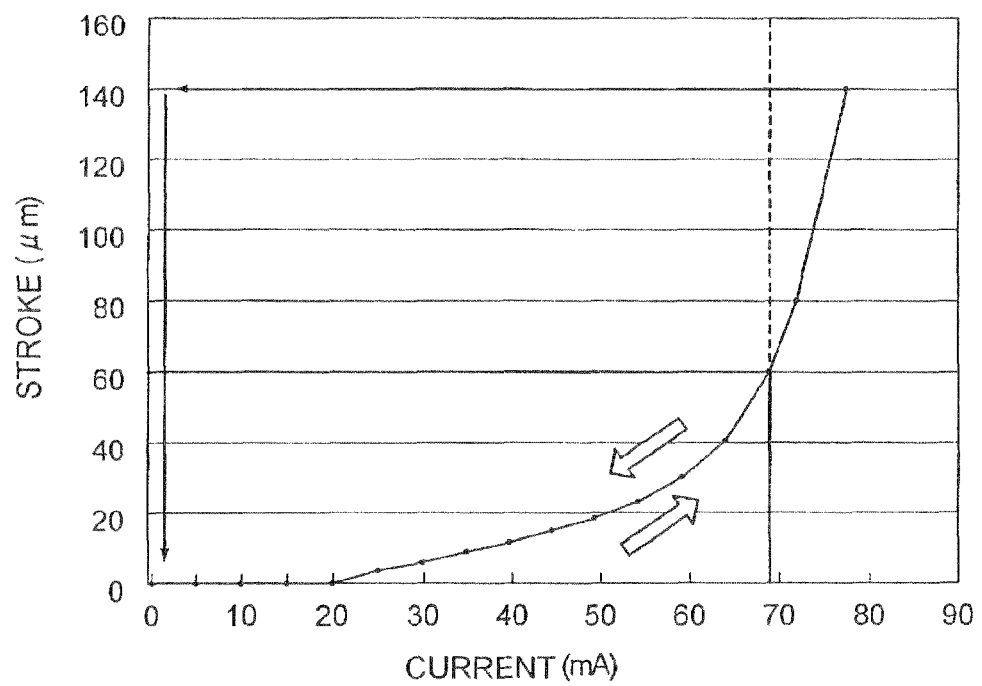
FIG. 7 is a characteristic view shoring a current-stroke curve in a second operational mode of the lens driving device illustrated in FIG. 1.

FIG. 7 is a characteristic view shoring a current-stroke curve in the second operational mode of the lens driving device 10. In FIG. 7, the horizontal axis represents a current (mA) flowing through the driving coil 16 and the vertical axis represents a moving distance (a stroke) (μm) of the lens holder 14. Herein, 0 μm indicates the position (the infinite (INF) position) of the state where the current does not flow through the driving coil 16 and the lens holder 14 is supported by the leaf spring 22.

In an example illustrated in FIG. 7, it is possible to use a range of the stroke of the lens holder 14 between 0 μm and 60 μm as an AF operational range of the lens driving device 10. In addition, it is assumed that the macro position of the lens driving device 10 is a position where the moving distance (the stroke) of the lens holder 14 moves by 140 μm.

In addition, in this example, it is assumed that it is referred to as a "normal direction" the direction of the current flowing through the driving coil 16 so that the flange 142 of the lens holder 14 is magnetized to the south pole while the lower end portion 141 of the lens holder 14 is magnetized to the north pole. That is, the normal direction is the direction in which the current flows through the driving coil 16 clockwise about a center of the optical axis O on plane viewing the lens driving device 10 from an upper surface side. On the other hand, conversely, it is assumed that it is referred to as a "reverse direction" the direction of the current flowing through the driving coil 16 so that the flange 142 of the lens holder 14 is magnetized to the north pole while the lower end portion 141 of the lens holder 14 is magnetized to the south pole. That is, the reverse direction is the direction in which the current flows through the driving coil 16 counterclockwise about the center of the optical axis O on plane viewing the lens driving device 10 from the upper surface side.

As apparent from FIG. 7, it is understood that the stroke of the lens holder 14 changes in a gently-sloping curve from 0 μm up to 60 μm in a range where the current flowing through the driving coil 16 in the normal direction (clockwise) lies from 0 mA up to 70 mA. Accordingly, by controlling the current value flowing through the driving coil 16 between 0 mA and 70 mA, it is understood that it is possible to drive the lens holder 14 in auto-focusing control with a steplessly variably at a range between 0 μm (the infinity (INF) position) and 60 μm.

In the manner which is described above, the macro position of the lens driving device 10 is the position where the stroke of the lens holder 14 becomes 140 μm. It will be assumed that the current of 80 mA flows through the driving coil 16 in the normal direction (clockwise). From FIG. 7, it is understood that the stroke of the lens holder 14 is over 140 μm at the current value of 80 mA. Accordingly, by the above-mentioned electromagnetic force and the Lorentz force, the flange 142 of the lens holder 14 comes into contact with the ring-shaped end portion 204 of the yoke 20 and is held therein against the urging force of the leaf spring 22 downwards.

In this state, it will be assumed that the current flowing through the driving coil 16 is interrupted so as to make the current value 0 mA. Inasmuch as the yoke 20 is magnetized so that the ring-shaped end portion 204 becomes the north pole while the lower end portion thereof becomes the south pole in the manner which is described above, the flange 142 of the lens holder 14 is maintained in a state where it comes into contact with the ring-shaped end portion 204 of the yoke 20.

In order to reset the lens driving device 10 to the infinity (INF) position (where the stroke of the lens holder 14 is 0 μm from this state, the current may flow through the driving coil 16 in the reverse direction (counterclockwise). This is because when the current flows through the driving coil 16 in the reverse direction (counterclockwise), the flange 142 of the lens holder 14 is magnetized in the north pole and therefore magnetically repels the ring-shaped end portion 204 of the yoke 20 that is magnetized in the north pole. Thereafter, the current flowing through the driving coil 16 is made to 0 mA.

Hereby, the lens driving device 10 is reset (recovered) to the infinity (INF) position.

In addition, the macro position is a close-in position for picking up, as a subject, an identifier such as a two-dimensional bar code or the like, and corresponds to a position where a position (a focal distance) between a lens of the camera and the two-dimensional bar code (the subject) is, for example, about 10 cm. On the other hand, the infinity (INF) position is an infinite position for picking up the subject which is substantially located at an infinite position, and corresponds to a position where the position (the focal distance) between the lens of the camera and the subject is infinity. In addition, the position where the stroke of the lens holder 14 is 60 μm corresponds to a position where the position (the focal distance) between the lens of the camera and the subject is about 10 cm.

Accordingly, it is possible for the lens driving device 10 according to the first exemplary embodiment to cover a range where the focal distance (the distance from the lens to the subject) is about 10 cm and between about 60 cm and the infinity. As a result, it is understood that it is possible to cover almost all range in consideration of a use condition of the camera in actuality.

As is evident from the above-description, it is possible to make the lens driving device 10 operate either the first operational mode or the second operational mode.

[First Modified Example]

Figure 8:
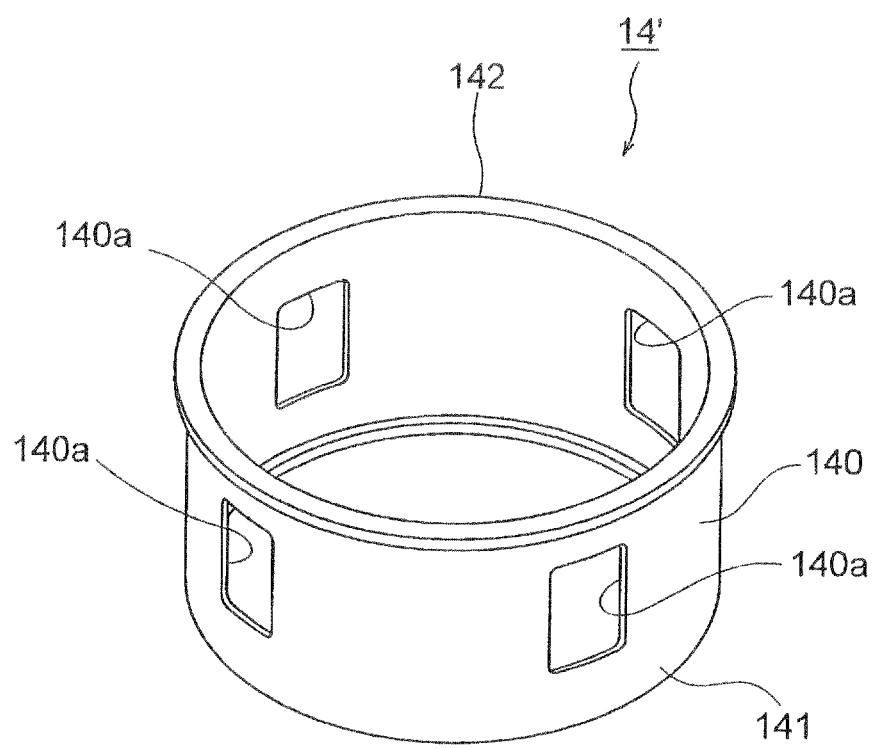
FIG. 8 is a perspective view showing a lens holder for use in a first modified example of the lens driving device illustrated in FIGS. 1-3.

Referring to FIG. 8, the description will proceed to a first modified example of the first exemplary embodiment of the present invention. FIG. 8 is a perspective view showing a lens holder 14' for use in the first modified example of the lens driving device 10 illustrated in FIGS. 1-3. Components other than the lens holder 14' are similar to those of the lens driving device 10 illustrated in FIGS. 1-3.

As shown in FIG. 3, the outer hollow cylindrical portion 202 of the yoke 20 has the four opening portions 202a at the lower end portion of the four corners thereof. Accordingly, the four opening portions 202a of the yoke 20 are a part where the Lorentz force based on the Fleming's left-hand rule does not act.

Consequently, the tubular portion 140 of the lens holder 14' illustrated in FIG. 8 has four holes 140a at positions corresponding to the four opening portions 202a of the yoke 20, respectively.

It is therefore possible to achieve light weight of the lens holder 14'.

[Second Modified Example]

Figure 9:
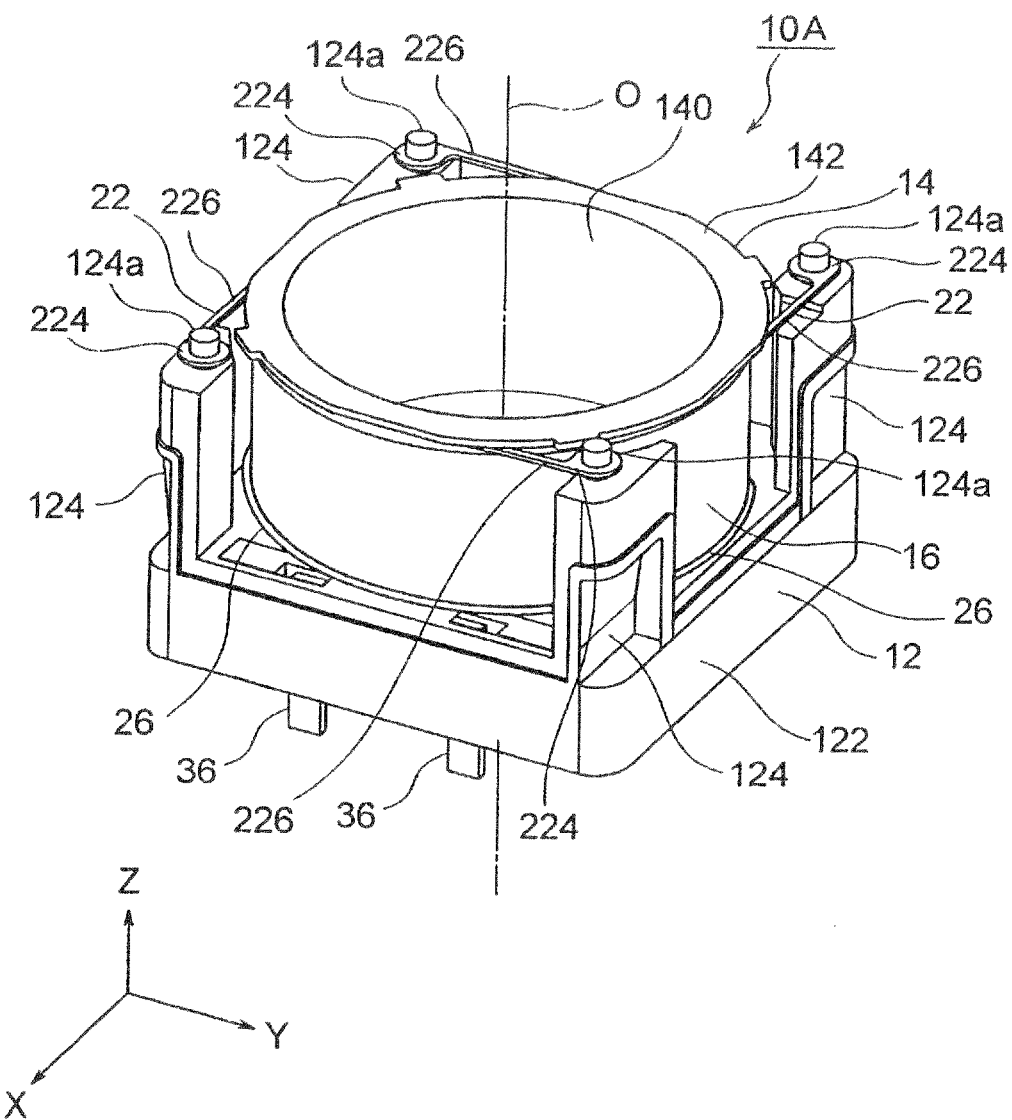
FIG. 9 is a perspective view of a lens driving device according to a second modified example of the first exemplary embodiment of the present invention with a yoke omitted, seen from a slanting front-high side.

Referring to FIG. 9, the description will proceed to a lens driving device 10A according to a second modified example of the first exemplary embodiment of the present invention. FIG. 9 is a perspective view of the lens driving device 10A with the yoke 20 omitted, seen from a slanting front-high side.

The illustrated lens driving device 10A is similar in structure to the lens driving device 10 illustrated in FIGS. 1-3 except that structure of coil traversing wires (the manner of wiring) which connects both ends of the driving coil 16 with the pair of electrodes 36.

Specifically, although illustration is not made, in the lens driving device 10, the both ends of the driving coil 16 and the pair of electrodes 36 are connected using the coil traversing wires with a normal manner (without any idea).

Contrarily, in the lens driving device 10A illustrated in FIG. 8, the coil traversing wires depicted at 26 are disposed to a lower side of the lens holder 14. More specifically, four coil traversing wires 26 are uniformly derived from lower ends of the driving coil 16 with bifilar winding and are soldered to the electrodes (terminals) 36.

The coil traversing wires such structure can perform a function similar to a lower leaf spring.

[Second Exemplary Embodiment]

Figure 10:
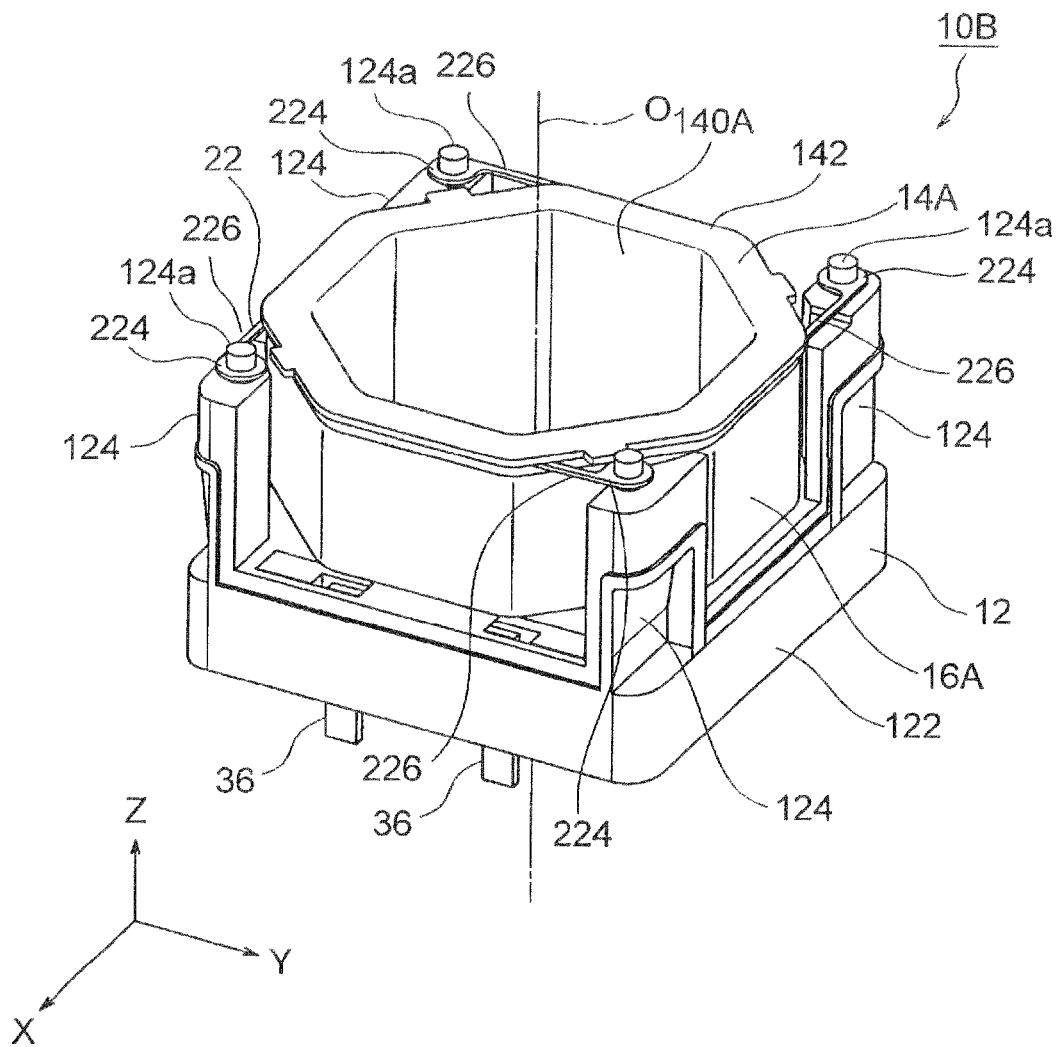
FIG. 10 is a perspective view of a lens driving device according to a second exemplary embodiment of the present invention with a yoke omitted, seen from a slanting front-high side.

Referring to FIG. 10, the description will proceed to a lens driving device 10B according to a second exemplary embodiment of the present invention. FIG. 10 is a perspective view of the lens driving device 10B with the yoke 20 omitted, seen from a slanting front-high side.

The illustrated lens driving device 10B is similar in structure to the lens driving device 10 illustrated in FIGS. 1-3 except that the lens holder and the driving coil are different in configuration and shape from those illustrated in FIGS. 1-3 as will later become clear. The lens holder and the driving coil are therefore depicted at 14A and 16A, respectively.

As shown in FIGS. 2 and 3, in the lens driving device 10 according to the first exemplary embodiment, the tubular portion 140 of the lens holder 14 has a cylindrical shape while the driving coil 16 also has a cylindrical shape. The driving coil 16 is bonded to the outer wall surface of the tubular portion 140 of the lens holder 14.

Contrarily, in the lens driving device 10B according to the second exemplary embodiment, the lens holder 14A has a tubular portion 140A which has an octagonal tubular shape while the driving coil 16A also has an octagonal tubular shape. The driving coil 16A is bonded to an outer wall surface of the tubular portion 140A of the lens holder 14A.

By making the lens holder 14A and the driving coil 16A the octagonal tubular shape, it is possible to expand an area in comparison with the lens holder 14 and the driving coil 16 each having the cylindrical shape. As a result, it is possible to increase the above-mentioned electromagnetic force and the Lorentz force in comparison with the first exemplary embodiment.

While this invention has been particularly shown and described with reference to the exemplary embodiments thereof, the invention is not limited to the embodiments. It will be understood by those of ordinary skill in the art that various changes in form and details may be therein without departing from the spirit and scope of the present invention as defined by the claims.

For example, although the cylindrical shape and the octagonal tubular shape alone are illustrated as the outside shape of the lens holder and the driving coil in the above-mentioned exemplary embodiments, the outside shape of the lens holder and the driving coil is not limited to those. The lens holder and the driving coil may have other outside shapes, for example, a rectangular tubular shape or the like. In addition, although the yoke alone is magnetized in order to make the lens driving device operate at the second operational mode in the above-mentioned first exemplary embodiment, both of the yoke and the lens holder may be magnetized or the lens holder alone may be magnetized.

The whole or part of the exemplary embodiments disclosed above can be described as, but not limited to, the following supplementary notes.

(Supplementary Note 1)

A lens driving device (10; 10A; 10B) for movably supporting a lens assembly (11) along a direction of an optical axis (O) of a lens, said lens driving device comprising:

an actuator base (12) disposed to a lower side of the direction of said optical axis (O);

a lens holder (14; 14'; 14A) disposed to an upper side of said actuator base, said lens holder having a tubular portion (140; 140A) for holding said lens assembly, said lens holder being made of a ferromagnet;

a ring-shaped driving coil (16; 16A) fixed to said lens holder so as to be positioned around the tubular portion;

a yoke (20) covering said lens holder so as to be apart from said driving coil and to oppose to said lens holder in a state where said driving coil is sandwiched therebetween; and a guide arrangement (22, 122a) guiding said lens holder along the direction of the optical axis (O).

(Supplementary Note 2)

The lens driving device (10; 10A; 10B) according to Supplementary note 1, wherein said actuator base (12) and said yoke (20) constitute a housing (24).

(Supplementary Note 3)

The lens driving device according to Supplementary note 1, wherein said lens holder (14; 14'; 14A) has a flange (142) protruding in a radial direction outwards at an upper end thereof, wherein said yoke (20) comprises an outer hollow cylindrical portion (202) disposed around said driving coil (16; 16A) and a ring-shaped end portion (204) extending from said outer hollow cylindrical portion inwards at an upper end of said outer hollow cylindrical portion, wherein said flange (142) and said ring-shaped end portion (204) are opposite to each other.

(Supplementary Note 4)

The lens driving device according to Supplementary note 2, wherein said guide arrangement includes an elastic member (22) disposed between said lend holder (14; 14'; 14A) and said housing (24), said elastic member (22) supporting said lend holder (14; 14'; 14A) in the direction of the optical axis (O) shiftably alone so as to position said lens holder (14; 14'; 14A) in a radial direction.

(Supplementary Note 5)

The lens driving device according to Supplementary note 4, wherein said elastic member comprises a leaf spring (22) disposed on an upper side of the tubular portion of said lens holder.

(Supplementary Note 6)

The lens driving device according to Supplementary note 5, wherein said actuator base (12) comprises a ring-shaped base portion (122) and four base protrusion portions (124) protruding from said base portion upwards at four corners of said base portion, wherein said leaf spring (22) comprises a ring portion (222) mounted to the flange of said lens holder, four end portions (224) mounted to upper ends of said four base protrusion portions (124), respectively, and four arm portions (226) bridged between said ring portion and said four end portions.

(Supplementary Note 7)

The lens driving device (10A) according to Supplementary note 5, wherein further comprises a plurality of coil traversing wires (26) disposed to a lower side of said lens holder.

(Supplementary Note 8)

The lens driving device (10; 10A; 10B) according to Supplementary note 3, wherein the outer hollow cylindrical portion (202) of said yoke (20) has a rectangular cylindrical shape.

(Supplementary Note 9)

The lens driving device according to Supplementary note 8, wherein the outer hollow cylindrical portion (202) of said yoke (20) has four opening portions (202a) at a lower end portion of four corners thereof, wherein the tubular portion (140) of said lens holder (14') has four holes (140a) at positions corresponding to said four opening portions, respectively.

(Supplementary Note 10)

The lens driving device (10; 10A; 10B) according to Supplementary note 1, wherein said yoke (20) becomes magnetized.

(Supplementary Note 11)

The lens driving device (10; 10A) according to Supplementary note 1, wherein the tubular portion (140) of said lens holder (14; 14') has a cylindrical shape, wherein said driving coil (16) has a cylindrical shape.

(Supplementary Note 12)

The lens driving device (10B) according to Supplementary note 1, wherein the tubular portion (140A) of said lens holder (14A) has an octagonal tubular shape, wherein said driving coil (16A) has an octagonal tubular shape.

In this connection, inasmuch as reference symbols in parentheses are attached in order to facilitate an understanding of this invention and are merely one example thereof, this invention is, of course, not limited to them.

What is claimed is:

1. A lens driving device without permanent magnet for movably supporting a lens assembly along a direction of an optical axis of a lens, said lens driving device comprising:

an actuator base disposed to a lower side of the direction of said optical axis;

a lens holder disposed to an upper side of said actuator base, said lens holder having a tubular portion for holding said lens assembly, said lens holder being made of a ferromagnet;

a ring-shaped driving coil fixed to said lens holder so as to be positioned around the tubular portion;

a yoke covering said lens holder so as to be apart from said driving coil and to oppose to said lens holder in a state where said driving coil is sandwiched therebetween; and a guide arrangement guiding said lens holder along the direction of the optical axis.

2. The lens driving device as claimed in claim 1, wherein said actuator base and said yoke constitute a housing.

3. The lens driving device as claimed in claim 2, wherein said guide arrangement includes an elastic member disposed between said lend holder and said housing, said elastic member supporting said lens holder in the direction of the optical axis shiftably alone so as to position said lens holder in a radial direction.

4. The lens driving device as claimed in claim 3, wherein said elastic member comprises a leaf spring disposed on an upper side of the tubular portion of said lens holder.

5. The lens driving device as claimed in claim 4, wherein said actuator base comprises a ring-shaped base portion and four base protrusion portions protruding from said base portion upwards at four corners of said base portion, and wherein said leaf spring comprises a ring portion mounted to the flange of said lens holder, four end portions mounted to upper ends of said four base protrusion portions, respectively, and four arm portions bridged between said ring portion and said four end portions.

6. The lens driving device as claimed in claim 4, wherein further comprises a plurality of coil traversing wires disposed to a lower side of said lens holder.

7. The lens driving device as claimed in claim 1, wherein said lens holder has a flange protruding in a radial direction outwards at an upper end thereof, wherein said yoke comprises an outer hollow cylindrical portion disposed around said driving coil and a ring-shaped end portion extending from said outer hollow cylindrical portion inwards at an upper end of said outer hollow cylindrical portion, and wherein said flange and said ring-shaped end portion are opposite to each other.

8. The lens driving device as claimed in claim 7, wherein the outer hollow cylindrical portion of said yoke has a rectangular cylindrical shape.

9. The lens driving device as claimed in claim 8, wherein the outer hollow cylindrical portion of said yoke has four opening portions at a lower end portion of four corners thereof, and wherein the tubular portion of said lens holder has four holes at positions corresponding to said four opening portions, respectively.

10. The lens driving device as claimed in claim 1, wherein said yoke becomes magnetized.

11. The lens holder driving device as claimed in claim 1, wherein the tubular portion of said lens holder has a cylindrical shape, and wherein said driving coil has a cylindrical shape.

12. The lens holder driving device as claimed in claim 1, wherein the tubular portion of said lens holder has an octagonal tubular shape, and wherein said driving coil has an octagonal tubular shape.

* * * * *